United States Patent US 8,650,423 B2
Li et al. (45) Date of Patent: Feb. 11, 2014

(54) DYNAMIC VOLTAGE AND CLOCK SCALING CONTROL BASED ON RUNNING AVERAGE, VARIANT AND TREND

(75) Inventors: Qing Li, Boulder, CO (US); Sumit Sur, Boulder, CO (US); Jeffrey A. Niemann, Boulder, CO (US); James M. Artmeier, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 13/301,480

(22) Filed: Nov. 21, 2011

(65) Prior Publication Data

US 2013/0097443 A1     Apr. 18, 2013

Related U.S. Application Data

(60) Provisional application No. 61/546,184, filed on Oct. 12, 2011.

(51) Int. Cl.
G06F 1/00 (2006.01)
G06F 1/26 (2006.01)
G06F 1/32 (2006.01)

(52) U.S. Cl.
USPC .............................. 713/322; 713/300; 713/320

(58) Field of Classification Search
USPC ......................................... 713/300, 320, 322
See application file for complete search history.

(56) References Cited

U.S. PATENT DOCUMENTS

| 5,349,688 | A * | 9/1994 | Nguyen | 713/323 |
| 5,923,873 | A * | 7/1999 | Massey et al. | 718/100 |
| 7,689,848 | B2 * | 3/2010 | Abbo et al. | 713/322 |
| 7,921,313 | B2 | 4/2011 | Ghiasi et al. | |
| 7,971,073 | B2 | 6/2011 | Hsu et al. | |
| 2004/0123297 | A1 * | 6/2004 | Flautner et al. | 718/102 |
| 2005/0182578 | A1 * | 8/2005 | Dolwin | 702/75 |
| 2008/0091963 | A1 * | 4/2008 | Cherukuri et al. | 713/320 |

(Continued)

FOREIGN PATENT DOCUMENTS

| JP | 62160560 A * | 7/1987 | G06F 13/20 |
| WO | 2010010515 A1 | 1/2010 | |
| WO | WO 2010010515 A1 * | 1/2010 | G06F 1/32 |

OTHER PUBLICATIONS

"NN9410111: Low-Overhead Processor Idle Detection in a Multitasking Operating System", Oct. 1, 1994, IBM, IBM Technical Disclosure Bulletin, vol. 37, Iss. 10, pp. 111-112.*

(Continued)

Primary Examiner — Faisal M Zaman
(74) Attorney, Agent, or Firm — Nicholas A. Cole (57) ABSTRACT

The aspects enable a computing device or microprocessor to scale the frequency and/or voltage of a processor to an optimal value balancing performance and power savings in view of a current processor workload. Busy and/or idle duration statistics are calculated from the processor during execution. The statistics may include a running average busy and/or idle duration or idle/busy ratio, a variance of the running average and a trend of the running average. Current busy or idle durations or an idle-to-busy ratio may be computed based on collected statistics. The current idle-to-busy ratio may be compared to a target idle-to-busy ratio and the frequency/voltage of the processor may be adjusted based on the results of the comparison to drive the current running average toward the target value. The target value of idle-to-busy ratio may be adjusted based on the calculated variance and/or trend values.

16 Claims, 5 Drawing Sheets

(56) References Cited

U.S. PATENT DOCUMENTS

| | | | |
|---|---|---|---|
| 2008/0126686 A1* | 5/2008 | Sokolov et al. | 711/103 |
| 2009/0089139 A1* | 4/2009 | Rojas-Cessa et al. | 705/9 |
| 2009/0177903 A1* | 7/2009 | Rozen et al. | 713/322 |
| 2009/0204830 A1* | 8/2009 | Frid et al. | 713/322 |
| 2009/0285219 A1* | 11/2009 | Romrell et al. | 370/395.41 |
| 2010/0077243 A1* | 3/2010 | Wang et al. | 713/323 |
| 2010/0115293 A1* | 5/2010 | Rotem et al. | 713/300 |
| 2010/0150002 A1* | 6/2010 | Kimble et al. | 370/252 |
| 2010/0191997 A1* | 7/2010 | Dodeja et al. | 713/323 |
| 2011/0007630 A1* | 1/2011 | Almhana et al. | 370/230 |
| 2011/0113269 A1 | 5/2011 | Park | |
| 2012/0233488 A1* | 9/2012 | Burchard et al. | 713/500 |

OTHER PUBLICATIONS

Harliono et al., "Implementation of dynamic voltage and frequency scaling on Blackfin processors," Intelligent Signal Processing and Communication Systems, 2005. ISPACS 2005. Proceedings of 2005 International Symposium on , pp. 193,196, Dec. 13-16, 2005.*

Bolla et al., "Dynamic voltage and frequency scaling in parallel network processors," High Performance Switching and Routing (HPSR), 2012 IEEE 13th International Conference on , pp. 242,249, Jun. 24-27, 2012.*

Homayoun et al., "Reducing the Instruction Queue Leakage Power in Superscalar Processors," Electrical and Computer Engineering, 2006. CCECE '06. Canadian Conference on , pp. 1685,1689, May 2006.*

Choi, Kihwan, et al. "Dynamic Voltage and Frequency Scaling Under a Precise Energy Model Considering Variable and Fixed Components of the System Power Dissipation"; University of Southern California, Los Angeles; Nov. 2004.

* cited by examiner

DYNAMIC VOLTAGE AND CLOCK SCALING CONTROL BASED ON RUNNING AVERAGE, VARIANT AND TREND

RELATED APPLICATIONS

This application claims the benefit of priority to U.S. Provisional Patent Application No. 61/546,184 entitled "Dynamic Voltage And Clock Scaling Control Based On Running Average, Variant And Trend" filed Oct. 12, 2011, the entire contents of which are hereby incorporated by reference.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. Battery life is a key driver of mobile electronic devices so methods and devices which enable conservation of battery power are important considerations in electronic device technologies.

SUMMARY

The various aspects include methods of conserving power in a computing device having a processor in which the method may include measuring busy or idle durations of the processor over a predetermined time span, calculating statistic values based on the measured durations, and adjusting an operating frequency of the processor based upon the calculated statistics values. In an aspect, calculating statistic values based on the measured durations may include calculating a running average of busy or idle durations, and may further include computing a current idle-to-busy ratio based on the running average of busy or idle durations comparing the current idle-to-busy ratio to a target idle-to-busy ratio and adjusting the frequency of the processor to steer the current idle-to-busy ratio toward the target idle-to-busy ratio. In an aspect, calculating statistic values based on the measured durations may further include calculating a variant value, and may further include determining whether the variance value exceeds a predetermined value and adjusting the target idle-to-busy ratio to emphasize a higher frequency when the variance value exceeds the predetermined value. In an aspect, the method may further include determining whether the variance value is less that the predetermined value and adjusting the target idle-to-busy ratio to emphasize a lower frequency when the variance value is less than the predetermined value. In an aspect, calculating statistic values based on the measured durations may include calculating a trend value, and may further include including determining whether the trend value indicates increasing processor demands and adjusting the target idle-to-busy ratio to emphasize a higher frequency when the trend value indicates increasing processor demands.

Further aspects include a computing device including means for accomplishing functions involved in the operations of the methods described above.

Further aspects include a computing device having a memory and a processor coupled to the memory, in which the processor is configured with processor-executable instructions to perform operations of the methods described above.

Further aspects include a non-transitory server-readable storage medium having stored thereon server-executable instructions configured to perform operations of the methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "computing device" are used interchangeably herein to refer to any one or all of cellular telephones, personal data assistants (PDA's), palmtop computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and operate under battery power such that power conservation methods are of benefit.

Traditionally, processor performance (e.g., speed) has been the overriding criterion of microprocessor designs, resulting in processor systems that simply set the processor supply voltage to the maximum allowable value. In recent years, power consumption has become a more significant criterion of microprocessor designs, especially in mobile environments where maximizing the battery life of wireless devices is important. Increased battery life maximizes the user's experience by allowing users to do more with a wireless device for longer periods of time. However, mobile device consumers not only demand increased battery life, but also fast and reliable processor performance. Therefore, to truly maximize the user's experience, power saving strategies should not alter the device's functionality or reliability. As such, designing efficient and effective power saving schemes that do not alter functionality is an important and challenging goal for mobile and wireless device providers.

As mentioned above, maximizing processor performance (e.g., speed) generally entails setting the supply voltage at the maximum allowable level. However, a typical mobile device does not require the maximum achievable performance at all times. The various aspects provide dynamic clock and voltage scaling (DCVS) methods that may be implemented to reduce the power consumption of the processors when peak performance is not necessary.

Dynamic clock and voltage scaling (DCVS) methods take advantage of periods of low processor utilization by scaling the supply voltage and clock frequency, resulting in a reduction in the device's overall power consumption. However, existing scaling methods simply adjust the frequency/voltage of the processor such that power consumption is minimized, performance is maximized, or such that the system alternates between these two objectives. Simply configuring a computing device to maximize power saving or to maximize performance (or to alternate between the two objectives) does not always result in the most efficient utilization of the mobile device processor. Mobile device users expect their mobile devices to be able to perform a wide variety of tasks, such as those for making calls, playing music, browsing the Internet, playing games, watching movies, etc. Each of these activities demands a certain amount of processing from the mobile device processor, and each activity may place a specific workload on the processor that varies considerably from the workloads of the other activities and/or of other times.

The various aspects implement dynamic clock and voltage scaling (DCVS) methods that dynamically adjust the processor's performance level to be commensurate with the current workload, while ensuring that the software running on the processor meets its performance deadlines. The various aspects scale the frequency and voltage to their optimal values for the required performance-level based on a statistical model of the actual device workloads. The various aspects determine when to adjust the frequency-voltage settings (e.g., scaling points) and to which frequency-voltage setting (e.g., scaling factor) the system is to be adjusted based upon calculated average, variance, and trend values for busy and idle durations. The various aspects determine the frequency-voltage settings by predicting the upcoming workload based on the processors workload history and statistics (particularly variance and/or trend values) collected and calculated during runtime.

As discussed above, a mobile computing device may encounter a number of different workloads over time. The character of the workloads may vary a great deal from task-to-task (e.g., from user touch-screen activities to video playback, from game play to web browsing, from video capture to music playback, etc.). Each of these varied workloads may be viewed as being "statistic in nature," and each workload may be viewed as having its own statistic signature, such as mean and variance of busy, idle or both busy and idle durations. As such, the processor workloads may be modeled and/or characterized using various statistics collected in real time during the execution of various tasks or applications. For example, a variety of statistics may be collected and calculated from the busy and/or idle cycles of each processor to model, characterize and/or predict future workloads. Adaptive DCVS methods may then be implemented to balance power consumption and performance levels based on the statistics or generated workload model.

By identifying current workload statistic signatures, the various aspects implement dynamic clock and voltage scaling (DCVS) methods suitable for the specific workloads present on a processor or processors of mobile devices. This targeted approach enables the generation and implementation of DCVS methods that are more efficient and adaptive than existing voltage scaling methods. This targeted approach also results in DCVS methods that require less processing overhead than existing scaling and power-saving solutions.

Figure 1:
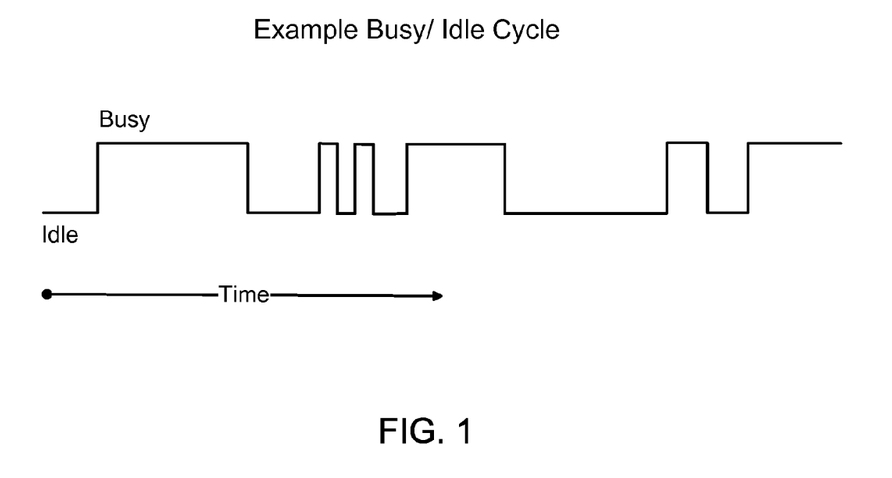
FIG. 1 is a diagram of processor activity of a typical mobile device processor that may be used to implement the various aspects.

FIG. 1 illustrates processor activity of a typical mobile device processor that may be analyzed using the various aspects. The processor activity may include a sequence of alternating busy and idle periods (which may also be referred to herein as "busy/idle cycles"). FIG. 1 illustrates that each of the busy or idle periods may be of varying durations, and that these durations may vary a great deal over time depending upon the processes and applications being accomplished by the device processor(s) at any given instant. These busy/idle duration variations make it difficult to accurately predict future busy/idle cycles with certainty and/or to accurately model/characterize the workloads of device processor(s) without performing a significant number of power intensive computations. Moreover, there is no net energy saved by performing dynamic voltage scaling operations if the amount of energy required to model the workload is greater than or equal to the amount of energy saved by scaling the frequency/voltage. The various aspects overcome these limitations by performing energy efficient computations/operations that do not require a significant amount of energy.

An operating system kernel is aware of processor busy and idle conditions, and may be configured to track and/or log each time a processor switches from a busy period to an idle period, and vice versa. For example, an operating system kernel may be configured to store timestamp information each time the processor transitions between busy and idle cycles. This timestamp information may be used to calculate previous busy and/or idle durations, and the duration values may be used to generate predictive models of current and future workloads based upon statistical calculations using these durations. In particular, the workload models may be generated using the statistic values of a running-average duration (of busy cycles, idle cycles or both cycles), and the variance of the running-average duration and trends in the running-average duration. Since the input information (e.g., timestamp information) is obtained from or made available by the kernel, the statistic values of running-average, variance, trend may be calculated using light weight processor operations which involve performing relatively simple calculations/operations (e.g., using shift operations instead of multiply operations).

A processor's workload normally involves fixed types of repeated operations. Each type of operation may require a certain amount of CPU cycles to execute, and the amount of CPU cycles required to execute these repeated operation does not change often. This amount of CPU work is referred to as workload quanta. The largest workload "quanta" for a given workload is herein referred to as the "LWLQ".

As mentioned above, workloads may be modeled and/or characterized using the running-average value, a variant value, and/or a trend value statistics collected in real time (i.e., at runtime and not estimated ahead of time). In an aspect, the running-average value may be calculated via a discrete infinite impulse response (IIR) filter, and may represent an average duration of the busy and/or idle cycles over a set time period. The running-average value may be calculated based on the durations of the busy and/or idle cycles, or based on a ratio of busy-to-idle cycles over the set time period. The running-average value may also be calculated as a weighted average of durations, such as by assigning higher weights to more recent busy and/or idle durations than to the less recent busy and/or idle durations which are used in the average value calculation. The running-average value may be computed using only a minimal number CPU cycles (e.g., via the use of an IIR filter and/or using only one shift and two add/minus operations as described below).

In an aspect, the DCVS methods may calculate variant values as the deviation from the running average, such as in a given interval, across a set number of intervals, or across the duration or CPU cycles used in determining the running average. The calculation of variance values may also be time-weighted in order to reflect more recent variations in the busy/idle cycles.

In an aspect, the DCVS methods may calculate trend values as a measure of changes in the running average over time, such as in a given interval, across a set number of intervals, or across the duration or CPU cycles used in determining the running average. The interval across which trend values are calculated may be the same as or different from the interval used for calculating variance values. For example, the variance may be calculated over the set interval used in calculating the running-average, while the trend values may be calculated over a shorter and more recent interval to more sensitive to real time changes in processor workload.

In an aspect, a mobile device may be configured to model/characterize the processor workloads by first calculating a running-average value, a variant value, and a trend value using busy/idle time stamps or duration information obtained from the operating system kernel. The models/characterizations of the workloads may then be used to more accurately scale the frequency and voltage via the aspect DCVS methods of the mobile device processor(s) for which the statistics were calculated with the objective of balancing power savings against processor performance on the current workload. The optimal operating frequency rate may be selected such that the processor performance is commensurate with the actual/predicted workload, and power savings are maximized and/or the impact on the user experience is minimized (e.g., users do not experience noticeable performance loss).

In an aspect, the statistic values (e.g., running-average, variance, and trend) may be calculated in terms of an idle/busy ratio. The idle/busy ratio may be calculated as being equal to an average of the idle (or busy) durations divided by the sum of the average idle duration and the average busy duration. A target idle/busy ratio may be set based on the calculated average statistics and/or the identified workload. In an aspect, the frequency (and voltage) of the processor may be adjusted in a control loop configured to steer the current idle/busy ratio towards a target ratio. In an aspect, the target busy/idle ratio may be a value that provides an optimum balance between processor performance and power savings. In an aspect, the frequency/voltage of the processor may be adjusted a bit higher than the value indicated by the running average idle/busy ratio in order to provide extra processing capability to accommodate occasional peaks in processor workload.

In striking a balance between power savings and processor performance, the competing parameters of processor speed and power consumption may be evaluated in view of the current busy/idle cycle statistics. If the processor is operated at or near its maximum frequency (i.e., CPU cycles per second), it will rapidly complete each processor or operation; however, it will be operating at higher voltage and thus exhibit a higher power consumption rate. If the processor is not particularly busy and is operated at or near the maximum frequency, it will quickly accomplish each operations, and therefore the idle durations between operations will be long (i.e., the busy-to-idle ratio will be small). While the processor is idle but operating at high voltage, its power consumption will be high even though it is not actively working most of the time. Thus, operating the processor at high frequency/high voltage when the workload is light (i.e., the busy-to-idle ratio is small) results in unnecessary battery drain with no performance benefit to the user.

On the other hand, operating the processor at a low frequency reduces the operating voltage, and thus lowers power consumption. While operating at low frequency the processor will require more time to complete each task. As a result, the amount of time the processor is idle may be short, and thus the busy-to-idle ratio may be large. When the processor workload is light, the longer time to complete each operation may not impact the user performance if the processor is able to keep up with all of the tasks being presented to it. However, if the processor operating frequency is low when the processor workload is high, the processor may not be able to keep up with the demand so operations may be queued and the user may experience slow or poor performance.

Thus, operating at a frequency that minimizes the idle time (and thus maximizes the busy time) of the processor can achieve the greatest power savings provided the processor is able to keep up with demand. In a simplistic analysis, reducing the processor frequency/voltage to the point where idle durations are small, but not zero would achieve the maximum power savings without decrementing performance. However, in typical operations, the variability in busy and a idle durations illustrated in FIGS. 1 and 2, both instantaneously and over longer durations (e.g., during different evolutions in an application) render the simplistic analysis infeasible. If the frequency/voltage is set according to peaks in processor workload (i.e., shortest idle durations), then the processor will consume more power on average than necessary because such peaks may occur infrequently, and thus on average, the processor is operating at an unnecessarily high frequency/voltage. If the frequency/voltage is set according to valleys in processor workload (i.e., longest idle durations), then the processor will save more power but frequently will exhibit poor performance when it is unable to keep up with the peaks in workload.

One solution to this balancing problem involves calculating a running average of the busy/idle durations, or a running average busy/idle ratio, and set the operating frequency/voltage based on that value. This aspect will better match the frequency/voltage of the processor to the processor's current workload, and allows the frequency/voltage to be adjusted as the workload rises and falls with time. This is particularly the case when the processor workload is relatively consistent over time, such as may be the case when playing an audio (MP3) or video file which typically involves a consistent processor workload.

However, setting the frequency/voltage solely on the running average of busy/idle durations or ratio may not provide an optimum balance between performance and power saving in many situations where workload is variable. For example, if the processor workload is characterized by periodic high-demand cycles (e.g., durations of high workload or complex calculations) which are balanced in an average calculation by lower demand periods, the running average may not reflect the high-demand cycles. If the processor frequency/voltage is set based solely on the running average busy/idle duration or ratio in such a situation, the user experience may be degraded when the processor is not operating at a high enough frequency to accomplish the high demand operations within the necessary time. On the other hand, the inverse situation may arise when the processor workload exhibits long idle cycles that are off set in the running average by periodic higher demand operations. If the frequency/voltage is set solely to the running average, then the processor will consume more power on average than necessary because such peaks may occur infrequently, and thus on average, the processor is operating at an unnecessarily high frequency/voltage.

This limitation in the use of running averages of busy/idle durations or ratios may be overcome in an aspect by also adjusting the frequency/voltage in a DCVS algorithm based on both the running average statistic and on the variance statistic. As is well known in statistics, the variance provides a measure in the magnitude of differences between sample values and the average. Thus, the larger the variance, the greater the differences from the average exhibited in the sample. Thus, in this aspect, using the variance in addition to the running average busy/idle durations or ratio can enable the DCVS algorithm to adapt to the variation reflected in the processor workload. For example, if the variance is high, which indicates that some operation cycles are significantly more demanding than the average, the DCVS algorithm may set the frequency/voltage higher than would be the case solely based on the running average. On the other hand, if the variance is low, indicating that the processor workload is very nearly always at the running average, the DCVS algorithm may set the frequency/voltage based upon the running average without requiring a safety factor. In a further aspect, the variance statistic may be calculated in a manner that reflects the direction of the variance, such as to higher or lower processor workload, so that if the variance is large but due to periodic episodes of long idle cycles, the operation frequency may be set at a lower value commensurate with the running average since the periodic episodes of low workload will not impact the user experience.

While using the variance of busy/idle durations or the idle/busy ratio can enable better matching of processor performance and power savings to the current workload pattern, this aspect may not be able to react swiftly to increases or decreases in workload. Therefore, in an aspect, trend statistics of busy/idle durations or the idle/busy ratio may be used to adjust the frequency/voltage in anticipation of future processor demands, and/or to identify circumstances in which the target ratio is not likely to be an accurate measure of the processor workload in the upcoming operations (e.g., probability of accuracy is less than 50 percent, less than 25 percent, etc.). For example, if the busy/idle durations or the idle/busy ratio are trending up, setting the frequency/voltage based upon the running average or on the running average plus variance may result in the processor running at too low a frequency to keep up with the increasing demand. As a result the user experience may be impacted as the processor will appear to be running slow. On the other hand, if the busy/idle durations or the idle/busy ratio are trending down (i.e., the workload on the processor is diminishing, such as when an application has terminated or finished rendering an image with no further operations required), setting the frequency/voltage based upon the running average or on the running average plus variance may result in the processor running at a higher frequency than necessary to accomplishing the diminishing workload. As a result an opportunity to conserve more battery power may be lost. By also considering the trend statistic, this aspect enables the processor to better follow changes in workload in order to better balance between performance and power savings.

In an aspect, the voltage and frequency of the processor may be adjusted in a DCVS algorithm based on the comparison between the target ratio and the actual idle/busy ratio. For example, the processor frequency may be decreased to save power, or increased to insure adequate performance, based on the comparison between the target ratio and the actual idle/busy ratio. In an aspect, the processor's frequency may be decreased if the actual idle/busy ratio is lower than the target ratio, and the processor's frequency may be increased if the idle/busy ratio is higher than the target ratio.

In an aspect, the target ratio may be adjusted up or down based upon the variance statistic value, the trend statistic value, or both. For example, in an aspect, an adjusted target ratio may be calculated based on the variance and/or trend values, and the frequency/voltage of the processor may be scaled towards the adjusted target ratio.

In another aspect, more complex control loop rules may be implemented taking into account the variance and trend statistics. For example, in an aspect, if the idle-to-busy variance is determined to be above a predetermined value, it may be determined that the processor activities/demands vary widely and that the running average is not an accurate measure of future processor demands. In an aspect, the target ratio may be adjusted to bias the algorithm to emphasize a higher processor frequency (e.g., by setting the target so that the processor is idle more than busy), which will adjust the DCVS algorithm to favor higher frequency operation.

In an aspect, if it is determined that the variance value is low (indicating that the processor demands are predictable) the idle-to-busy variance may be adjusted to minimize the amount of time the processor is idle.

In the various aspects, adjustments similar to those made for the variance value may be made based on the trend statistic. For example, if the trend value indicates that processor demand is increasing, the idle-to-busy target may be adjusted to increase the amount of time the processor is idle, which may adjust the DCVS algorithm to favor higher frequency operation. If, on the other hand, the trend value indicates that the trend is toward decreasing processor demands, the idle-to-busy variance may be adjusted to minimize the amount of time the processor is idle in anticipation of future lower processor demands.

Further aspects may include steps to identify a workload or class of workloads based on the statistics discussed above. The voltage and frequency of the processor may be adjusted based on the identified workload or class.

Processes for implementing the various aspects are illustrated in FIGS. 3-6.

Figure 2:
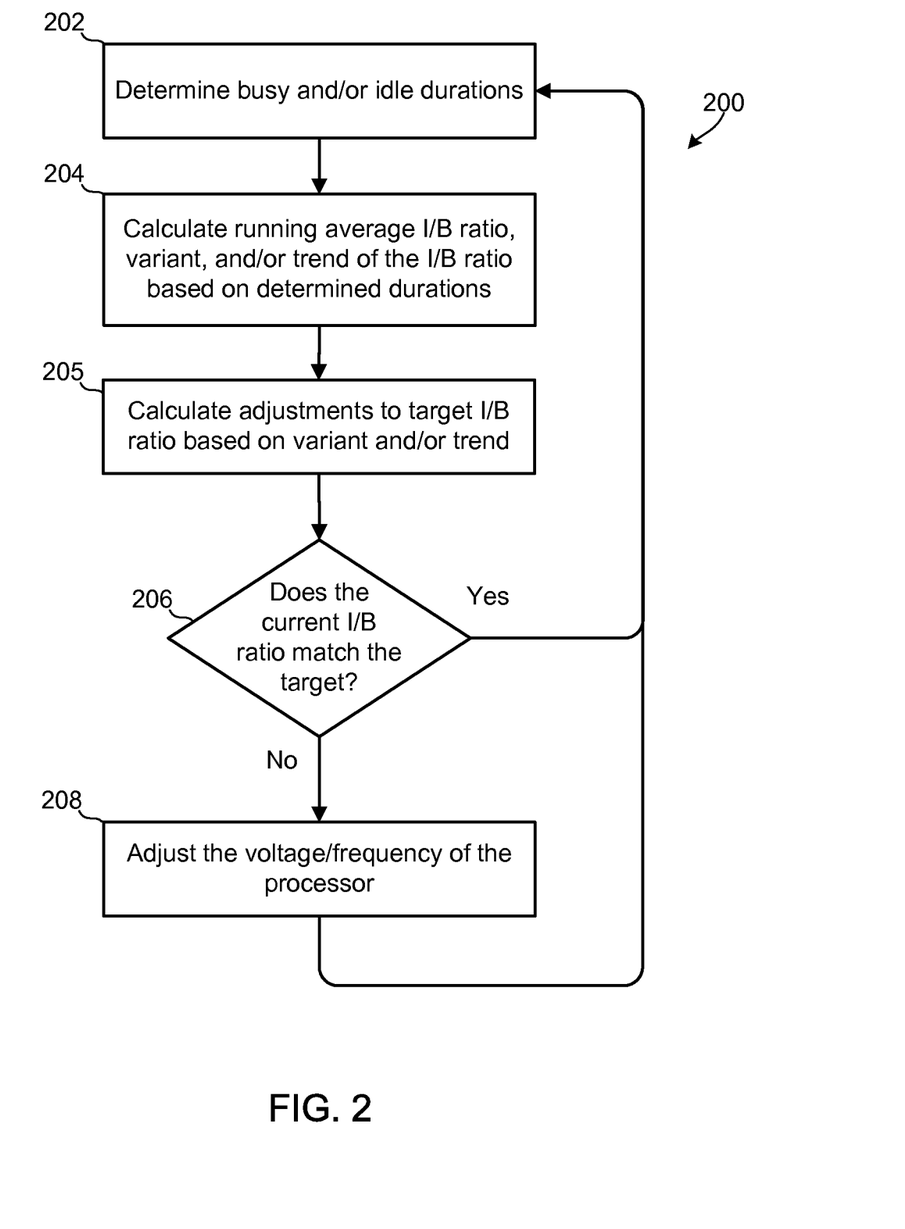
FIG. 2 is a process flow diagram of an aspect method for dynamically scaling the clock and voltage on a mobile device processor.

FIG. 2 illustrates an aspect method 200 for dynamically scaling the clock and voltage on a mobile device processor. In block 202, the lengths, recurrence, and other characteristics of the idle and/or busy durations may be measured, and an idle/busy ratio may be calculated. The idle/busy ratio may be calculated as the average of the idle (or busy) durations divided by the sum of the average idle duration and the average busy duration. Other formulas may also be used to calculate the running averages. In block 204, one or more of the running-average, variance, and trend statistics may be calculated, and the running average may be used to calculate the current idle/busy ratio. In block 205, the target idle/busy ratio may be calculated or adjusted based upon the variance and/or the trend statistic values in order to provide an optimum balance between processor performance and power savings in view of the current operating conditions.

In determination block 206, the processor executing the DCVS algorithm may compare the current idle/busy ratio with the target idle/busy ratio. If the current idle/busy ratio matches the target idle/busy ratio (determination block 206="Yes"), in block 202, no adjustments may be made to the processor frequency/voltage, and the cycle may repeat with the lengths, recurrence, and other characteristics of the next set of idle and/or busy durations being measured, and a new idle/busy ratio being calculated. If the current idle/busy ratio does not match the target idle/busy ratio (determination block 206="No"), in block 208, the frequency/voltage of the mobile device processor may be scaled up or scaled down to match the processor workload. The processor may then return to block 202 to repeat the process in a control loop configured to steer the current idle/busy ratio towards the target ratio in a continuous, dynamic manner.

In an aspect, the variance statistic value and trend statistic value may be used to identify future processor demands and/or to identify circumstances in which the target ratio is not likely be accurate, and for adjusting the target ratio accordingly. The adjusted target ratio may be calculated based on the variance and/or trend values, and the frequency/voltage of the processor may be scaled towards the adjusted target ratio.

Figure 3:
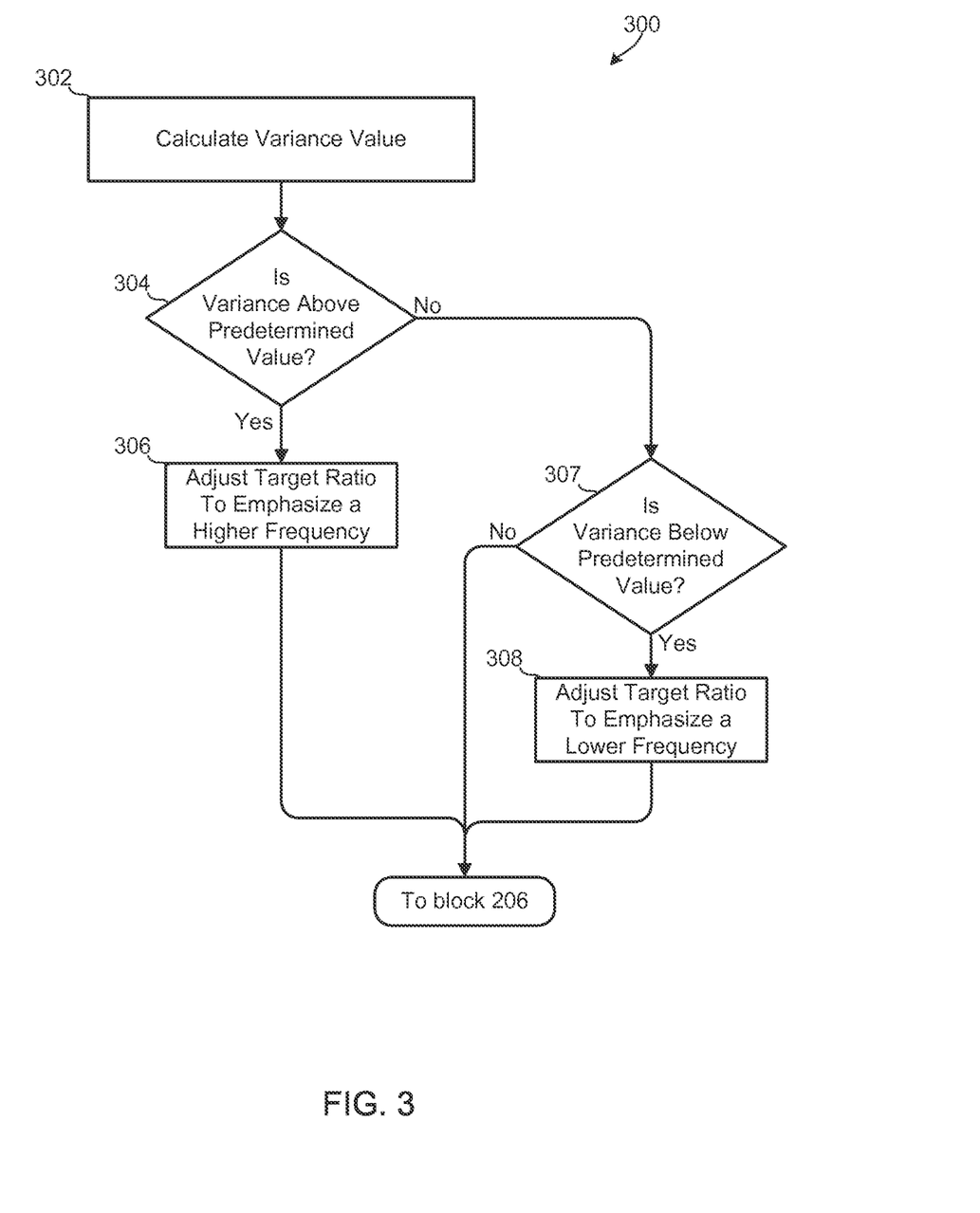
FIG. 3 is a process flow diagram of an aspect method for dynamically scaling the clock and voltage on a mobile device processor based on variance.

FIG. 3 illustrates an aspect method 300 for dynamically scaling the clock and voltage on a mobile device processor based on the variance statistic value, such as may be implemented in block 204 of FIG. 2. In block 302, the variance value may be calculated as described herein. In determination block 304, the processor may determine whether the idle-to-busy variance is above a predetermined value. If the idle-to-busy variance is determined to be above the predetermined value (determination block 304="Yes"), the processor activities/demands may be identified as varying widely, and the running average method may be identified as not providing an accurate measure of future processor demands. In block 306, the processor may adjust the target ratio to bias the algorithm to emphasize a higher processor frequency (e.g., by setting the target so that the processor is idle more than busy), which will adjust the DCVS algorithm to favor higher frequency operation. Thereafter, the processor may proceed with method 200 in block 206 to adjust the processor frequency/voltage as described above.

If the processor determines that the idle-to-busy variance is not above the predetermined value (i.e., determination block 304="No"), the processor may determine if the variance is below a predetermined value in determination block 307. If so (i.e., determination block 307="Yes"), in block 308, the processor may adjust the target idle/busy ratio to minimize the amount of time the processor is idle. Thereafter, the processor may proceed with method 200 in block 206 to adjust the processor frequency/voltage as described above. If the processor determines that the variance is not below the predetermined value (i.e., determination block 307="Yes"), no adjustments may be made to the target I/B ratio and the processor may proceed to adjust the frequency/voltage as described above.

Figure 4:
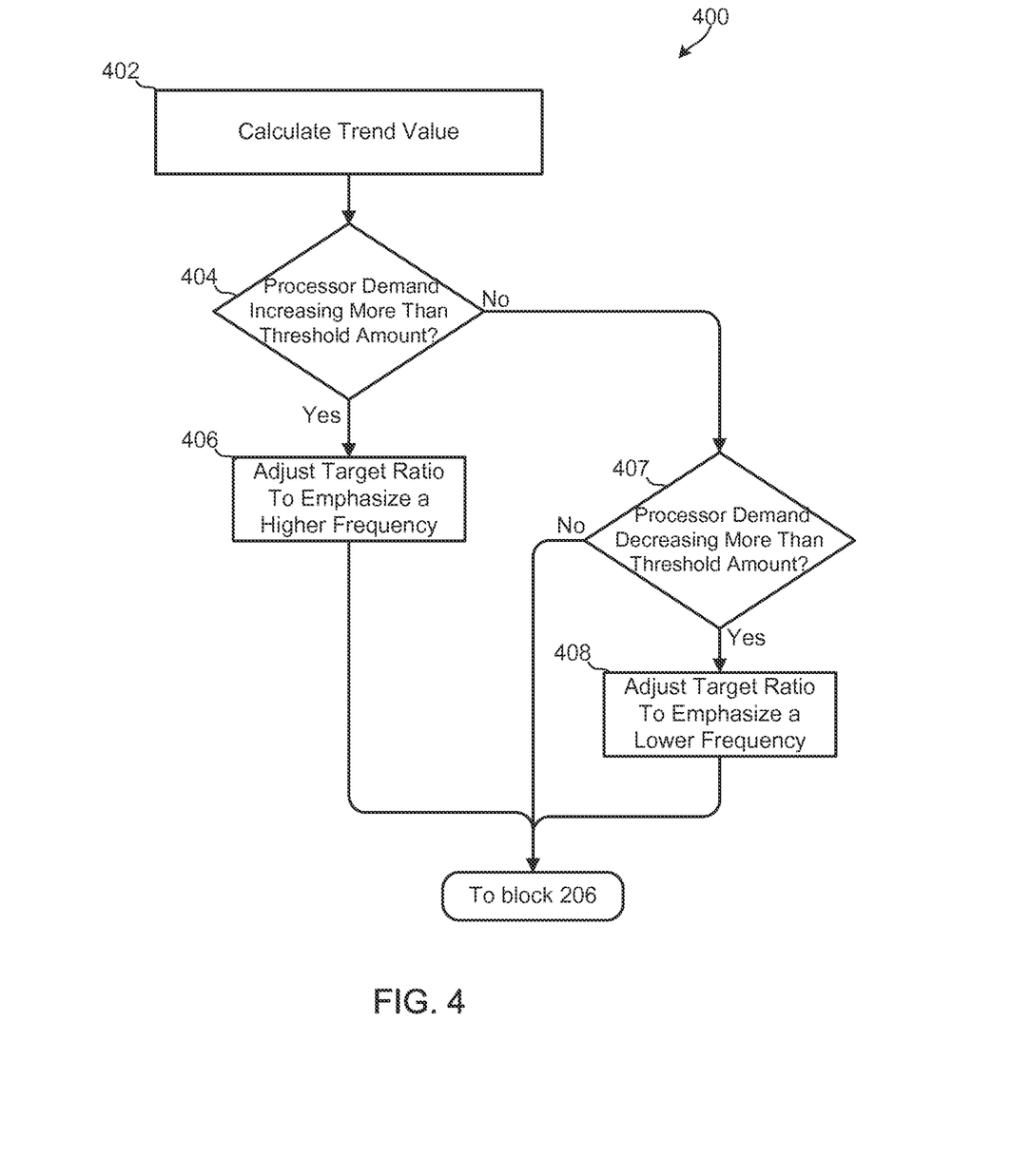
FIG. 4 is a process flow diagram of an aspect method for dynamically scaling the clock and voltage on a mobile device processor based on trend.

In a similar manner the target idle/busy target may be adjusted based on the calculated trend statistics. FIG. 4 illustrates an aspect method 400 for dynamically scaling the clock and voltage on a mobile device processor based on the trend statistic value. In block 402, the processor may calculate the trend value. In determination block 404, the processor may determine whether the idle-to-busy trend indicates that processor demand is increasing in an amount that exceeds a threshold value (to prevent thrashing). If the idle-to-busy trend indicates that processor demand is increasing (i.e., determination block 404="Yes"), in block 406, the processor may increase the target idle-to-busy ratio to favor higher frequency operation. Thereafter, the processor may proceed with method 200 in block 206 to adjust the processor frequency/voltage as described above.

If the trend value indicates that the trend is not increasing beyond the threshold amount (i.e., determination block 404="No"), the processor may determine whether the demand is decreasing more than a threshold amount in determination block 407. If so, (i.e., determination block 407="Yes"), in block 408 the processor may reduce the target idle-to-busy ratio to minimize the amount of time the processor is idle in anticipation of future lower processor demands. Thereafter, the processor may proceed with method 200 in block 206 to adjust the processor frequency/voltage as described above. If the processor demand is not decreasing more than the threshold amount, no changes may be made to the target idle/busy target, and processor may proceed with method 200 in block 206 to adjust the processor frequency/voltage as described above.

While methods 200, 300, and 400 describe the adjustments to the target idle/busy ratio being accomplished before the adjustments are made to the processor frequency/voltage, in an aspect such adjustments in the DVCS target values may be accomplished after the frequency/voltage adjustments. In another aspect, the adjustments in the DVCS target values may be accomplished in a parallel process.

Further aspects may include operations to identify a workload or class of workloads based on the statistics discussed above. The voltage and frequency of the processor may be adjusted based on the identified workload or class. Other methods for using variance and trend statistics in order to perfect the adjustment of processor frequency and voltage to current processor workloads may also be implemented.

Figure 5:
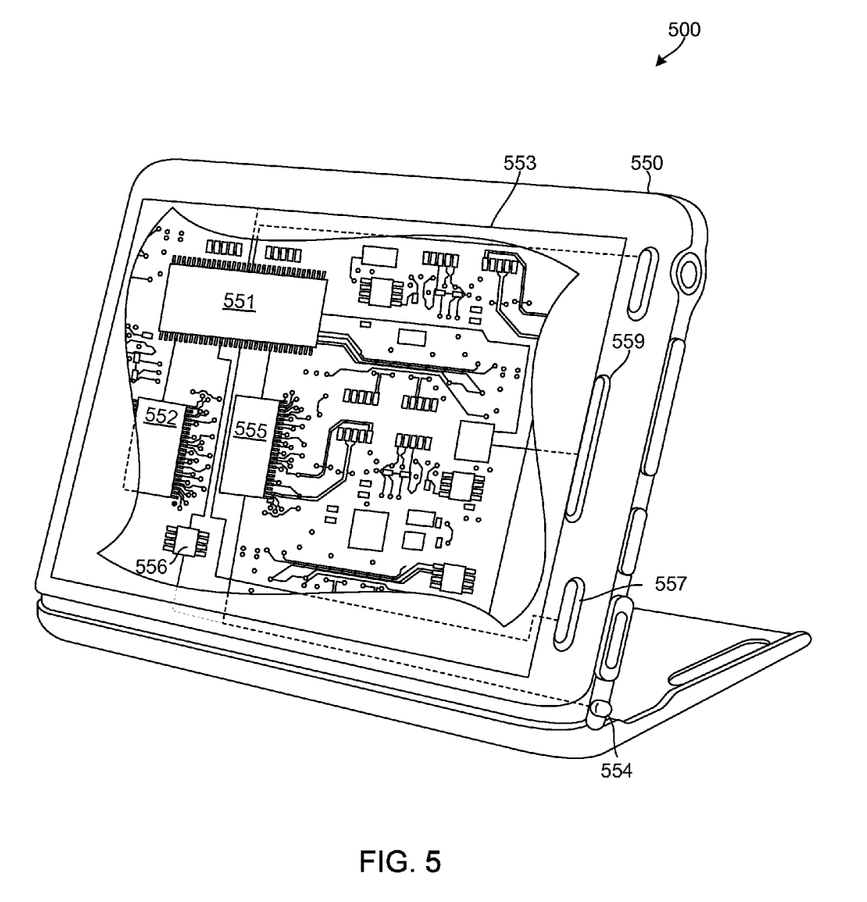
FIG. 5 is a component block diagram of a mobile device suitable for implementing the various aspects.

Typical mobile devices 500 suitable for use with the various aspects will have in common the components illustrated in FIG. 5. For example, an exemplary mobile receiver device 550 may include a processor 551 coupled to internal memory 552, a display 553, and to a speaker 559. Additionally, the mobile device 550 may have an antenna 554 for sending and receiving electromagnetic radiation that is connected to a mobile multimedia receiver 556 coupled to the processor 551. In some aspects, the mobile multimedia receiver 556 may include an internal processor 558, such as a digital signal processor (DSP) for controlling operations of the receiver 556 and communicating with the device processor 551. Mobile devices typically also include a key pad 556 or miniature keyboard and menu selection buttons or rocker switches 557 for receiving user inputs.

The processor 551 may be any programmable microprocessor, microcomputer or multiple processor chip or chips that can be configured by processor-executable software instructions (applications) to perform a variety of functions, including the functions of the various aspects described herein. Also, the functions of the various aspects may be implemented in a DSP processor 558 within the receiver 556 configured with DSP-executable instructions. Typically, software applications and processor-executable instructions may be stored in the internal memory 552 before they are accessed and loaded into the processor 551. In some mobile devices, the processor 551 may include internal memory sufficient to store the application software instructions. In some mobile devices, the secure memory may be in a separate memory chip coupled to the processor 551. In many mobile devices 550, the internal memory 552 may be a volatile or nonvolatile memory, such as flash memory, or a mixture of both. For the purposes of this description, a general reference to memory refers to all memory accessible by the processor 551, including internal memory 552, removable memory plugged into the mobile device, and memory within the processor 551 itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The operations of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for conserving power in a computing device having a processor, comprising:
    measuring busy or idle durations of the processor over a predetermined time span;
    calculating a running average of busy or idle durations;
    calculating a variance value based on the magnitude of differences between sample values of busy or idle durations and the running average of busy or idle durations;
    determining whether the variance value exceeds a predetermined value;
    adjusting a target idle-to-busy ratio to increase the amount of time the processor is idle when the variance value exceeds the predetermined value;
    computing a current idle-to-busy ratio based on the running average of busy or idle durations;
    comparing the current idle-to-busy ratio to the target idle-to-busy ratio; and
    adjusting the frequency of the processor to steer the current idle-to-busy ratio toward the target idle-to-busy ratio.

2. The method of claim 1, further comprising:
    determining whether the variance value is less than the predetermined value; and
    adjusting the target idle-to-busy ratio to decrease the amount of time the processor is idle when the variance value is less than the predetermined value.

3. The method of claim 1, further comprising:
    calculating a trend value;
    determining whether the trend value indicates increasing processor demands; and
    adjusting the target idle-to-busy ratio to increase the amount of time the processor is idle when the trend value indicates increasing processor demands.

4. The method of claim 3, further comprising:
    determining whether the trend value indicates decreasing processor demands; and
    adjusting the target idle-to-busy ratio to decrease the amount of time the processor is idle when the trend value indicates decreasing processor demands.

5. A computing device, comprising:
    means for measuring busy or idle durations of a processor of the computing device over a predetermined time span;
    means for calculating a running average of busy or idle durations;

means for calculating a variance value based the magnitude of differences between sample values of busy or idle durations and the running average of busy or idle durations;
means for determining whether the variance value exceeds a predetermined value;
means for adjusting a target idle-to-busy ratio to increase the amount of time the processor is idle when the variance value exceeds the predetermined value;
means for computing a current idle-to-busy ratio based on the running average of busy or idle durations;
means for comparing the current idle-to-busy ratio to the target idle-to-busy ratio; and
means for adjusting the frequency of the processor to steer the current idle-to-busy ratio toward the target idle-to-busy ratio.

6. The computing device of claim 5, further comprising:
means for determining whether the variance value is less than the predetermined value; and
means for adjusting the target idle-to-busy ratio to decrease the amount of time the processor is idle when the variance value is less than the predetermined value.

7. The computing device of claim 5, further comprising:
means for calculating a trend value;
means for determining whether the trend value indicates increasing processor demands; and
means for adjusting the target idle-to-busy ratio to increase the amount of time the processor is idle when the trend value indicates increasing processor demands.

8. The computing device of claim 7, further comprising:
means for determining whether the trend value indicates decreasing processor demands; and
means for adjusting the target idle-to-busy ratio to decrease the amount of time the processor is idle when the trend value indicates decreasing processor demands.

9. A computing device, comprising:
a memory; and
a processor coupled to the memory, wherein the processor is configured with processor-executable instructions to perform operations comprising:
measuring busy or idle durations of the processor over a predetermined time span;
calculating a running average of busy or idle durations;
calculating a variance value based on the magnitude of differences between sample values of busy or idle durations and the running average of busy or idle durations;
determining whether the variance value exceeds a predetermined value;
adjusting a target idle-to-busy ratio to increase the amount of time the processor is idle when the variance value exceeds the predetermined value;
computing a current idle-to-busy ratio based on the running average of busy or idle durations;
comparing the current idle-to-busy ratio to the target idle-to-busy ratio; and
adjusting the frequency of the processor to steer the current idle-to-busy ratio toward the target idle-to-busy ratio.

10. The computing device of claim 9, wherein the processor is configured with processor-executable instructions to perform operations further comprising:
determining whether the variance value is less than the predetermined value; and
adjusting the target idle-to-busy ratio to decrease the amount of time the processor is idle when the variance value is less than the predetermined value.

11. The computing device of claim 9, wherein the processor is configured with processor-executable instructions to perform operations further comprising:
calculating a trend value;
determining whether the trend value indicates increasing processor demands; and
adjusting the target idle-to-busy ratio to increase the amount of time the processor is idle when the trend value indicates increasing processor demands.

12. The computing device of claim 11, wherein the processor is configured with processor-executable instructions to perform operations further comprising:
determining whether the trend value indicates decreasing processor demands; and
adjusting the target idle-to-busy ratio to decrease the amount of time the processor is idle when the trend value indicates decreasing processor demands.

13. A non-transitory computer readable storage medium having stored thereon processor-executable software instructions configured to cause a processor to perform operations for conserving power in a computing device, comprising:
measuring busy or idle durations of a device processor over a predetermined time span;
calculating a running average of busy or idle durations;
calculating a variance value based on the magnitude of differences between sample values of busy or idle durations and the running average of busy or idle durations;
determining whether the variance value exceeds a predetermined value;
adjusting a target idle-to-busy ratio to increase the amount of time the processor is idle when the variance value exceeds the predetermined value;
computing a current idle-to-busy ratio based on the running average of busy or idle durations;
comparing the current idle-to-busy ratio to the target idle-to-busy ratio; and
adjusting the frequency of the device processor to steer the current idle-to-busy ratio toward the target idle-to-busy ratio.

14. The non-transitory computer readable storage medium of claim 13, wherein the stored processor-executable software instructions are configured to cause a processor to perform operations further comprising:
determining whether the variance value is less than the predetermined value; and
adjusting the target idle-to-busy ratio to decrease the amount of time the processor is idle when the variance value is less than the predetermined value.

15. The non-transitory computer readable storage medium of claim 13, wherein the stored processor-executable software instructions are configured to cause a processor to perform operations further comprising:
calculating a trend value;
determining whether the trend value indicates increasing device processor demands; and
adjusting the target idle-to-busy ratio to increase the amount of time the processor is idle when the trend value indicates increasing device processor demands.

16. The non-transitory computer readable storage medium of claim 15, wherein the processor-executable software instructions are configured to cause a processor to perform operations further comprising:
determining whether the trend value indicates decreasing device processor demands; and adjusting the target idle-to-busy ratio to decrease the amount of time the processor is idle when the trend value indicates decreasing device processor demands.

* * * * *